US009793755B2

(12) United States Patent
Garrity et al.

(10) Patent No.: US 9,793,755 B2
(45) Date of Patent: Oct. 17, 2017

(54) UNINTERRUPTIBLE POWER SUPPLY AND METHOD FOR MANAGING POWER FLOW IN A GRID-TIED PHOTOVOLTAIC SYSTEM

(71) Applicant: Garrity Power Services LLC, Rockwall, TX (US)

(72) Inventors: Paul Garrity, Rockwall, TX (US); Aaron Jungreis, Ra'anana (IL)

(73) Assignee: Garrity Power Services LLC, Rockwall, TX (US)

( * ) Notice: Subject to any disclaimer, the term of this patent is extended or adjusted under 35 U.S.C. 154(b) by 203 days.

(21) Appl. No.: 14/811,644

(22) Filed: Jul. 28, 2015

(65) Prior Publication Data

US 2017/0033597 A1    Feb. 2, 2017

(51) Int. Cl.
  *H02J 9/06*    (2006.01)
  *H02J 7/00*    (2006.01)
  *H02J 7/35*    (2006.01)

(52) U.S. Cl.
  CPC ............. *H02J 9/062* (2013.01); *H02J 7/007* (2013.01); *H02J 7/35* (2013.01)

(58) Field of Classification Search
  CPC ............. H02J 7/007; H02J 9/062; H02J 7/35
  USPC ......................................................... 307/66
  See application file for complete search history.

(56) References Cited

U.S. PATENT DOCUMENTS

| 5,384,792 A | 1/1995 | Hirachi |
| 5,612,581 A | 3/1997 | Kageyama |
| 5,745,356 A | 4/1998 | Tassitino, Jr. et al. |
| 6,304,006 B1 | 10/2001 | Jungreis |
| 6,323,620 B1 | 11/2001 | Miyoshi et al. |
| 8,067,855 B2 | 11/2011 | Mumtaz et al. |
| 8,159,178 B2 | 4/2012 | Serban |

(Continued)

FOREIGN PATENT DOCUMENTS

| EP | 2793345 A1 | 10/2014 |
| JP | 2015012705 A | 1/2015 |
| WO | 2010036974 A2 | 4/2010 |

OTHER PUBLICATIONS

Serban, Emanuel and Serban, Helmine; A Control Strategy for a Distributed Power Generation Microgrid Application with Voltage and Current Controlled Source Converter, IEEE Transactions on Power Electronics; vol. 25 (12); Dec. 2010; U.S.

*Primary Examiner* — Robert Deberadinis
(74) *Attorney, Agent, or Firm* — Hovey Williams LLP

(57) ABSTRACT

An uninterruptible power supply (UPS) and method for managing power flow in a grid-tied photovoltaic system, wherein the UPS provides grid-tie, backup power, voltage-frequency relay, power factor control, and load-leveling functions. The UPS includes a bi-directional power converter, a switch, and a controller. The converter converts between AC power and DC power, and includes ports which are connectable to a battery, a plurality of current-source inverters, a load, and an electric utility grid. The switch selectively connects and disconnects the converter from the grid. The controller monitors the voltage and current associated with the grid, and based thereon, controls the switch and the bi-directional power converter to manage power flow in the grid-tied photovoltaic system. The controller also manages the power factor of the current flowing into or out of the grid by introducing appropriate distortion or displacement current.

20 Claims, 12 Drawing Sheets

(56) References Cited

U.S. PATENT DOCUMENTS

| | | |
|---|---|---|
| 8,810,202 B2 | 8/2014 | Nomura |
| 2011/0175451 A1* | 7/2011 | Moon ..................... H02J 9/062 |
| | | 307/66 |
| 2014/0218985 A1* | 8/2014 | Yu ......................... H02M 7/537 |
| | | 363/97 |
| 2014/0265579 A1 | 9/2014 | Mumtaz |

* cited by examiner

UNINTERRUPTIBLE POWER SUPPLY AND METHOD FOR MANAGING POWER FLOW IN A GRID-TIED PHOTOVOLTAIC SYSTEM

FIELD

The present invention relates to systems and methods for managing power flow in grid-tied photovoltaic systems.

BACKGROUND

Distributed power generation is becoming more common as society increases its use of renewable resources such as solar energy. The majority of solar power systems currently in use employ multiple polycrystalline silicon photovoltaic panels connected to string inverters that send the generated power back into an electric utility grid. The photovoltaic panels are usually connected in series to provide a high direct current (DC) voltage to the string inverters. Other solar power systems use micro-inverters, each of which is connected to a single photovoltaic panel, which allows for low voltage DC connections and individual tracking of the power output of each panel.

The proliferation of distributed power generation has caused some problems in maintaining the stability of the utility grid. As a result, many electric utilities world-wide are seeking increased functionality in grid-tied inverters to help stabilize the grid. For example, some require grid-tied photovoltaic inverters to gradually reduce output power when the grid frequency deviates beyond a set limit. Furthermore, to increase the safety of utility systems, most photovoltaic systems are required to have separate voltage-frequency relays which monitor the voltage and the frequency of the grid and disconnect all photovoltaic inverters from the grid if the voltage or frequency deviates beyond a predetermined range. Voltage-frequency relays provide additional assurance that photovoltaic inverters do not push power onto the utility grid when the grid is disconnected. However, voltage-frequency relays add cost to photovoltaic systems beyond what would otherwise be required.

Photovoltaic inverters include grid-tied inverters and stand-alone inverters. Grid-tied inverters act as a current source and can only be used to pump power into the utility grid. Stand-alone inverters act as a voltage source and can provide power to a load in the absence of an electric utility grid. For a number of reasons, grid-tied inverters are far more prevalent than stand-alone inverters, and therefore the costs of production substantially favors grid-tied inverters. Furthermore, grid-tied inverters are sold based on a payback of savings in utility bills, often coupled with financial incentives by local governments to encourage the use of "green" energy. Stand-alone inverters, on the hand, usually have no pay-back and no financial incentives, and function only to provide power in the rare event of a grid outage or to provide power in places that have no utility grid. However, many customers would prefer a system that can provide both grid-tied capability and backup power in the event of an outage, as long as the cost of the final system is not substantially higher than that of the grid-tied system alone.

As distributed power generation systems proliferate, utilities are selling less average power to the grid, but they must still provide the same peak grid load because distributed power generation systems usually cannot be relied on to always provide power. As a result, some utilities are trying to cut costs by enforcing peak load requirements on their customers. The local peak power reductions can be accomplished through the smart control of loads or through local battery or other storage that maintains power during the peak load times. Utilities also expect distributed power generation systems to provide additional functionality for producing local volt-ampere reactive (VAR) control on the grid. Utilities would also prefer to cut costs caused by the distorted power factor of customer loads. Incorporating these functions into grid-tied inverters can increase cost. Relatedly, grid-tied battery systems can level loads. However, such systems are usually large (utility) scale because small residential-sized systems are rarely cost-effective for use merely as load-leveling systems.

This background discussion is intended to provide information related to the present invention which is not necessarily prior art.

SUMMARY

Embodiments of the present invention solve the above-described and other problems and limitations by providing an uninterruptible power supply (UPS) and associated method for managing power flow in a grid-tied photovoltaic system, wherein the UPS may provide a grid-tie function, a backup power function, a voltage-frequency relay function, a power factor control function, and a load-leveling function.

In one embodiment, the UPS may be configured to manage a flow of power between a battery, one or more current-source inverters connected to one or more photovoltaic panels, a load, and an AC voltage source, and may include a bi-directional power converter, a switch, and a controller. The bi-directional power converter may convert between alternating current (AC) power and DC power, and may include a DC port which is connectable to the battery, a load port which is connectable to both the current-source inverters and the load, and an AC port which is connectable to the AC voltage source. The switch may selectively connect and disconnect the AC port from the AC voltage source. The controller may monitor a voltage and a current associated with the AC voltage source at the AC port, and based thereon, control the switch and the bi-directional power converter. If the amplitude and the frequency are not within pre-determined limits, the controller may function as follows. The controller may open the switch to disconnect the AC voltage source from the load and from the current-source inverters. The controller may cause the bi-directional power converter to act as a voltage-source converter. If the battery is charging, the controller may set a frequency on the load port to a nominal frequency to allow a maximum power flow from the current-source inverters to the load. If the battery is not charging, the controller may set the frequency on the load port to reduce the power flow from the current-source inverters to the load until the battery is being trickle-charged. However, if the amplitude and the frequency are within the pre-determined limits, the controller may function as follows. The controller may close the switch to connect the AC voltage source. The controller may cause the bi-directional power convert to act as a current-source converter. The controller may compare a net power being consumed by the load and produced by the current-source inverters to an allowable peak load power. If the net power is lower than the allowable peak load power, the controller may direct power from the AC voltage source to the battery. If the net power is higher than the allowable peak load power, the controller may direct power from the battery into the AC voltage source.

In one embodiment, the UPS may comprise a bi-directional converter, a direct current power port, a first alternating current power port, and a controller. The bi-directional converter may be configured to operate as an alternating current voltage source. The direct current power port may be configured to be coupled to a battery. The first alternating current power port may be coupled to the bi-directional converter and may be configured to be coupled to a current-source inverter, wherein the current-source inverter may be configured to adjust an output power as a function of a frequency of the alternating current voltage source. The controller may be configured to regulate a power flow of the current-source inverter by adjusting a frequency of the alternating current voltage source.

The UPS may further include any one or more of the following features. The controller may be configured to regulate the power flow of the current-source inverter to maintain the battery at a predetermined ideal charging state. The UPS may further include a second alternating current power port configured to be coupled to an alternating current grid. The bi-directional converter may also be configured as an active rectifier. The bi-directional converter may also be configured as an alternating current source. The first alternating current power port may also be configured to be coupled to a load. The current-source inverter may be configured to disconnect from the alternating current voltage source for a predetermined outage period when the alternating current voltage source frequency goes outside of a predetermined frequency limit, and the controller may be configured to control the bi-directional power converter to source power to the load during the predetermined outage period. The controller may include a predetermined power level set-point, and the controller may be configured to source power from the battery to the alternating current grid when the power sourced from the alternating current grid exceeds the predetermined power level set-point. The controller may include a non-volatile memory element configured to store the predetermined power level set-point. The controller may include a real-time clock, and the predetermined power level set-point may vary as a function of the time of day as determined by the real-time clock. The controller may further include a calendar function, and the predetermined power level set-point may vary as a function of the day as determined by the calendar function. The controller may be provided with a communication element, and the communication element may be configured to receive a real-time update of the power level set-point. The controller may be configured to disconnect the current-source inverter from the alternating current grid when a voltage or frequency of the alternating current grid goes outside of a predetermined limit. The controller may be configured to regulate a power flow of the current-source inverter so as to cancel a distortion current produced by the load. The controller may be configured to regulate a power flow of the current-source inverter to produce an alternating current that is displaced from the grid voltage. An amount of displacement of the alternating current may be determined by a preset limit or controlled through external communication with the controller.

Additionally, the present invention may be characterized as a method based on the functionality of the UPS.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
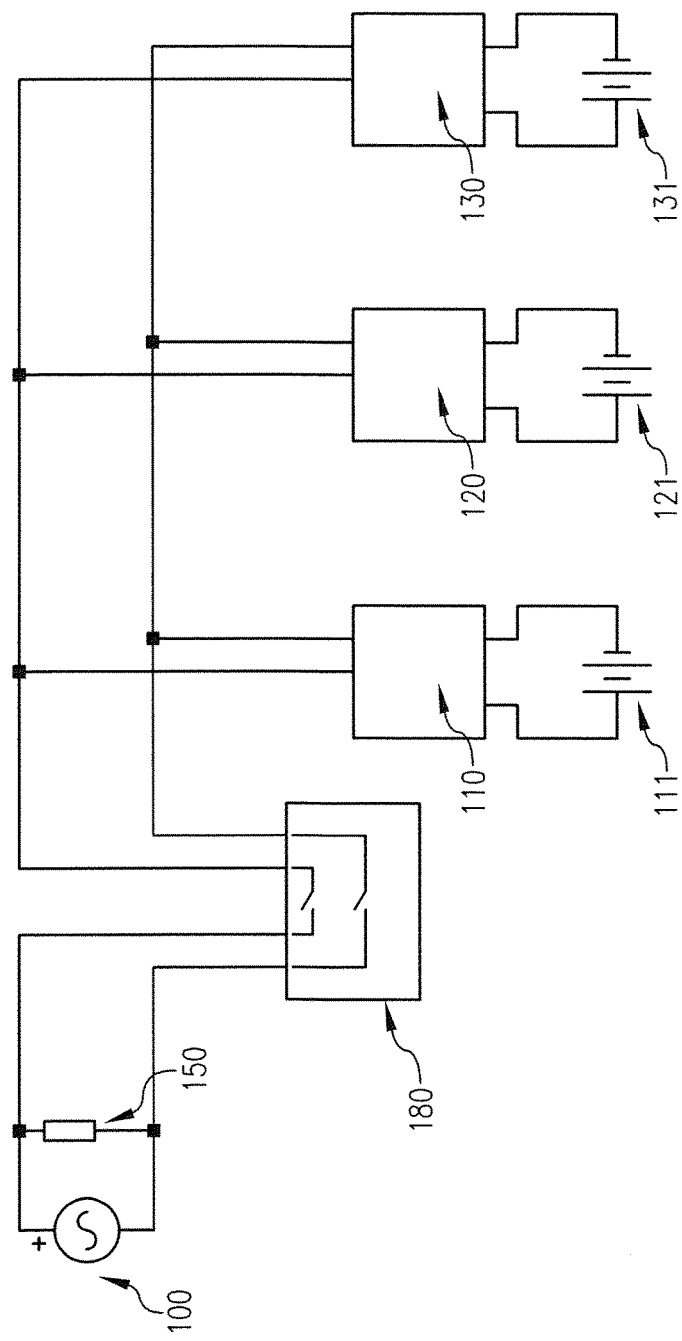
FIG. 1 (PRIOR ART) is a diagram of a prior art photovoltaic system.

Referring to FIG. 1 (PRIOR ART), a typical prior art configuration of micro-inverters is shown. A utility grid 100 provides an AC voltage source to a house load 150. A first micro-inverter 110 receives DC power from a photovoltaic module 111. The micro-inverter 110 creates a current source which is in phase with the utility grid 100 and which sources power to the grid 100 according to the power available from the photovoltaic module 111. Second and third micro-inverters 120,130 draw power from second and third photovoltaic modules 121,131, respectively, and function substantially identically to the first micro-inverter 110. Although three micro-inverters 110,120,130 are shown, the system may include any number of micro-inverters.

A voltage-frequency relay 180 monitors the voltage and frequency of the utility grid 100. When either the voltage or frequency of the utility grid 100 deviates outside of a predetermined range (which varies from one region of the world to another), the voltage-frequency relay 180 opens internal switches to disconnect the micro-inverters 110,120, 130, thus providing an additional level of safety to prevent the micro-inverters 110,120,130 from pumping power into the utility grid 100 that may be, e.g., shut down for repair or maintenance. For example, the relay 180 may be set so that when the frequency (in a 50 Hz system) goes below 47.5 Hz or above 50.5 Hz, the relay opens 180 and disconnects the micro-inverters 110,120,130.

The system of FIG. 1 (PRIOR ART) provides the benefit of reducing electric utility bills by photovoltaically generating power. One drawback of the micro-inverters 110,120, 130 is that they only function as current sources. That is, when the utility grid 100 is not producing power, it is not possible to operate the house load 150 from the prior art micro-inverters.

Figure 2:
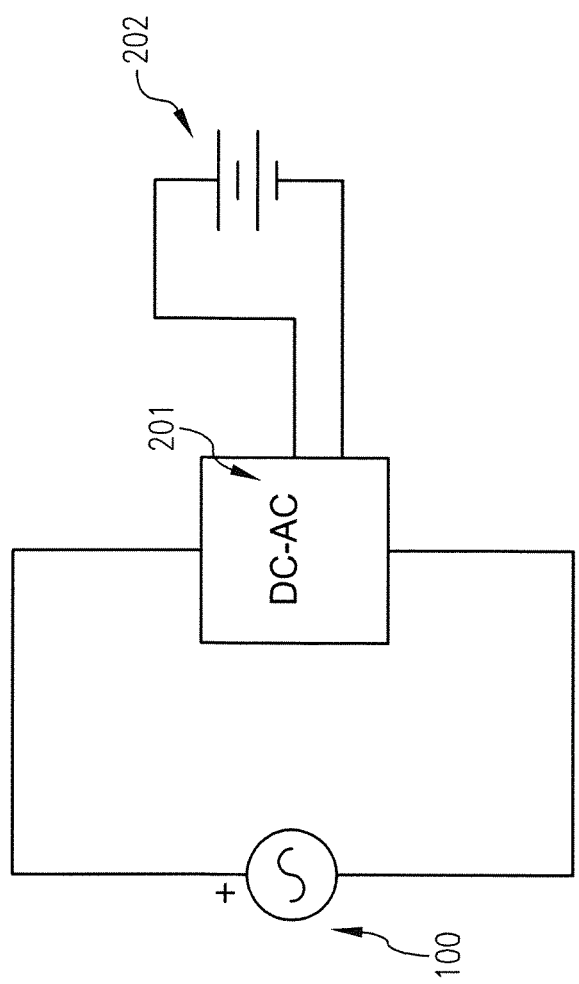
FIG. 2 (PRIOR ART) is a diagram of prior-art load-leveling system that may be combined with the prior art photovoltaic system of FIG. 1 (PRIOR ART)

Referring to FIG. 2 (PRIOR ART), a typical prior art configuration of a battery load-leveling system is shown. The utility grid 100 feeds or receives AC power from a bidirectional current-source/sink power converter 201 which, in turn, receives or sources DC power from a battery 202. When the utility grid 100 has excess capacity, the grid 100 sources AC power to the power converter 201, which, in turn, charges the battery 202. When the grid 100 requires more capacity, the battery 202 sources DC power to the power converter 201, which, in turn, sources AC current to the utility grid 100.

The load-leveling system of FIG. 2 (PRIOR ART) is typically implemented at the utility level (such as in a sub-station) and provides the benefit of allowing the utility to be designed for lower peak loads than would otherwise be required. One drawback of the system is the high cost. In many cases, it is less expensive to design the utility for increased load capacity than to provide the load-leveling system. Furthermore, electric utilities are trending toward more incentives or more requirements for customers to reduce their peak loads rather than for the utilities to provide large load-leveling systems. In order to satisfy utility incentives or requirements, customers have to monitor and turn off large loads at various times or to plan usage of large appliances accordingly.

Embodiments of the present invention provide a UPS and method for managing power flow in a grid-tied photovoltaic system, wherein the UPS may provide a grid-tie function, a backup power function, a voltage-frequency relay function, a power factor control function, and a load-leveling function. The system may broadly comprise the UPS including a bi-directional power converter configured as a first AC voltage source; a DC power port connectable to a battery; and an AC power port connected to the power converter and connectable to one or more current-source inverters, wherein the current-source inverters are configured to adjust their output power as a function of a frequency of the AC voltage source. The current-source inverters are configured to disconnect from the AC voltage source for a predetermined outage period when the AC voltage source frequency is outside of predetermined frequency limits, and a controller is configured to control the power converter to source power to a load during the predetermined outage period. The controller may be further configured to source power from the battery to the AC utility grid when the power sourced from the AC utility grid exceeds a predetermined power level set-point.

In one implementation, the controller may include a non-volatile memory element configured to store the predetermined power level set-point. In one implementation, the controller may include a real-time clock, and the predetermined power level set-point may vary as a function of the time-of-day.

Figure 3:
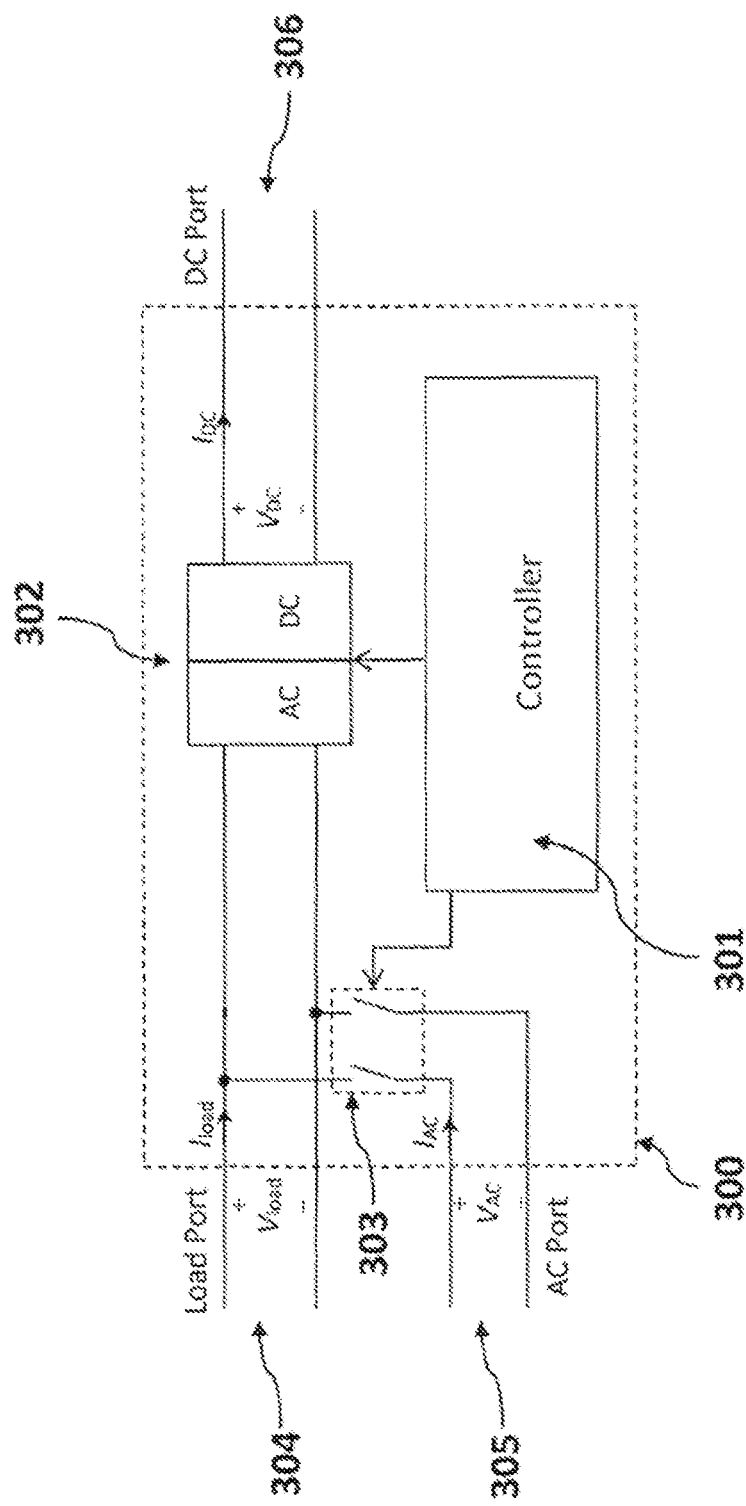
FIG. 3 is a diagram of a UPS constructed in accordance with an embodiment of the present inventions.
Figure 4:
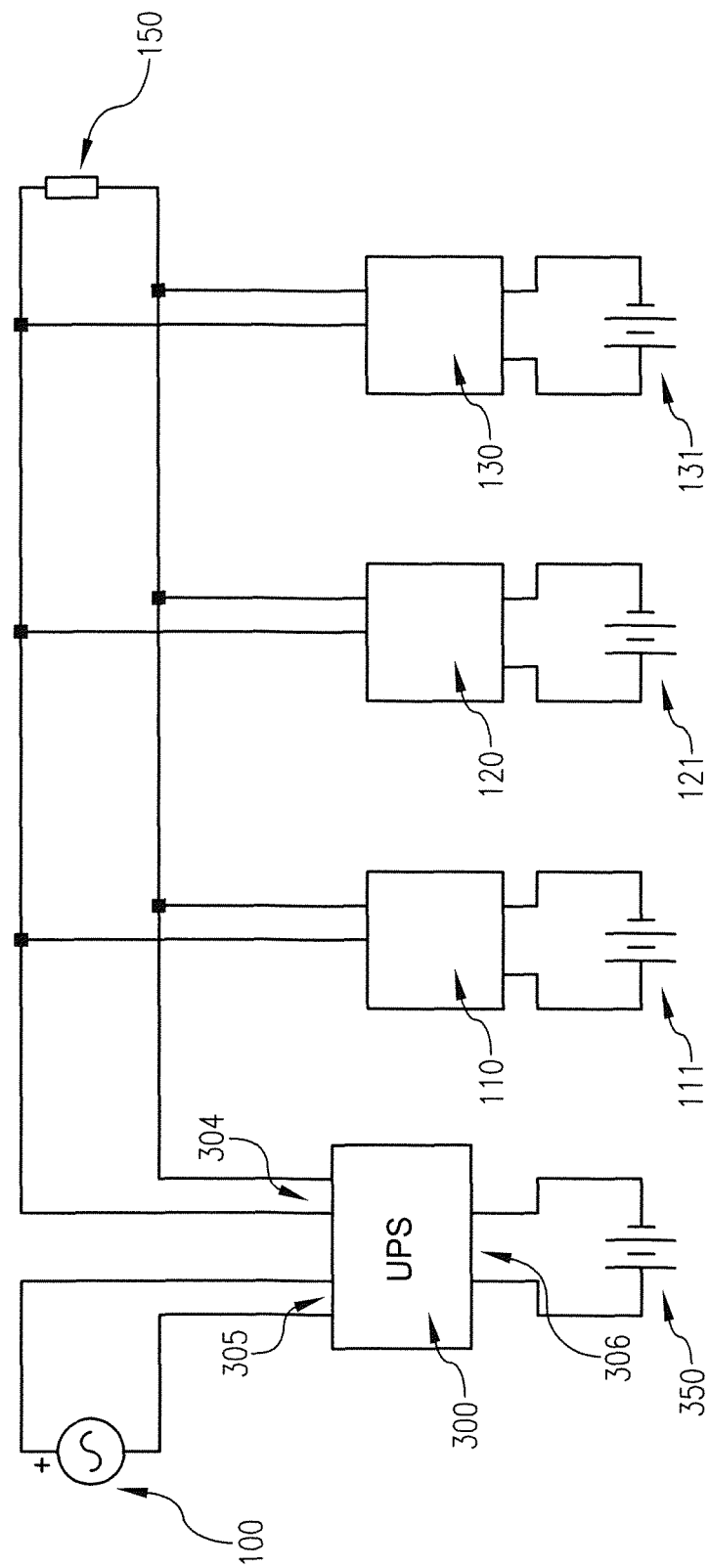
FIG. 4 is a diagram of a grid-tied photovoltaic system incorporating the UPS of FIG. 3.

FIG. 3 shows an embodiment of the UPS 300, and FIG. 4 shows an exemplary photovoltaic system into which the UPS 300 may be incorporated. Although three micro-inverters 110,120,130 are shown, the system may include any number of micro-inverters. Additionally or alternatively, the system may employ string inverters or substantially any other current-source inverters designed to limit power when the frequency of the grid 100 varies by a predetermined amount from the nominal grid frequency. For example, the current-source inverters may be designed to linearly decrease their power output from 100% to 40% when the frequency increases from 50.2 Hz to 50.5 Hz. Thus, although described in terms of the micro-inverters 110,120,130, the system may employ other additional or alternative current-source inverters.

The UPS 300 broadly comprises a DC port 306 which is connectable to a battery; an AC port 305 which is connectable to the utility grid 100, and a load port 304 which can be connected to both an AC load 150 and the micro-inverters 110,120,130 (or other current-source inverters) that have been configured to reduce power output when the frequency of their power terminals increases above a predetermined level. The UPS 300 may further comprise a switch 303, a controller 301, and a power converter 302. The switch 303 may be a relay or a set of contactors that can be used to disconnect the AC port 305 from the power converter 302 and from the load port 304. The switch 303 may be any suitable switch, such as a double-throw switch, a single-throw switch, or a semiconductor switch. Furthermore, although the switch 303 is shown as part of the UPS 300, the switch 303 could also be implemented as a separate component but still controlled by the controller 301.

The power converter 302 may function as either a current-source converter or a voltage-source converter and may provide bi-directional power flow. When operating as a current-source converter and charging the battery on the DC port 306, the power converter 302 may draw a nearly sinusoidal AC current from the AC port 305 and convert the AC current to DC current for charging a battery 350 which may be connected to the DC port 306. When operating as a current-source inverter for peak load regulation, the power converter 302 may use power from the DC port 306 to inject current into the AC port 305. When operating as a voltage-source converter, the power converter 302 may produce a sinusoidal voltage having a frequency that may be used to limit (and thus regulate) power produced by the micro-inverters 110,120,130 connected to the load port 304.

An overall power factor of a load or power source is composed of a distortion component and a displacement component. Distortion causes current harmonics to be drawn from or injected into the electric utility grid without causing any phase angle between the current and voltage. Displacement causes voltage and current to be out of phase with each other without the addition of any harmonic currents. Most loads or power sources produce both distortion and displacement. While most current-source inverters produce nearly sinusoidal current, loads can vary substantially in the level of distortion or displacement current drawn by the grid. A utility grid can adjust for displacement by adding passive components onto the grid. Distortion, on the other hand, cannot be practically adjusted for by the utility.

When the power converter 302 operates as a current-source inverter, it may also regulate power factor. Because the controller 301 can monitor load current, the converter 302 is also able to regulate output current in such a way as to cancel the distortion or displacement current produced by the load 150. Furthermore, the power converter 302 can inject further displacement current into the grid according to the needs of the utility based on either preset values or commands given through an external communication port.

In one implementation, the power converter 302 may be a single converter that regulates output according to either output voltage (in voltage-source mode) or output current (in current-source mode). In another implementation, the power converter 302 may be several converters that are coupled together. For example, a current-source inverter and a voltage-source inverter may be coupled together to provide a converter that can operate in either voltage-source mode or current-source mode.

The controller 301 may control the power converter 302 and the switch 303. The controller 301 may monitor voltage and current at the AC port 305, the load port 304, and the DC port 306, and may use the voltage and current information to deduce the state of the utility grid 100 that is connected to the AC port 305. That is, the controller 301 may be able to determine whether the voltage and frequency of the grid 100 are in a range that would allow normal operation of the micro-inverters 110,120,130 that are connected to the load port 304. Thus, in addition to enabling the UPS function, the controller 301 may also be able to work with the switch 303 to function as a voltage-frequency relay. The controller 301 may be further able to determine a charge state of the battery 350 that may be connected to the DC port 306, and to determine net power generation or net load at the load port 304.

Referring to FIG. 4, the micro-inverters 110,120,130 as well as the house load 150 may all be connected across the load port 304 of the UPS 300. The micro-inverters 110,120,130 may each be connected to respective photovoltaic panels 111,121,131. The utility grid 100 may be connected to the AC port 305 of the UPS 300, and the battery 350 may be connected to the DC port 306 of the UPS 300.

Figure 5A:
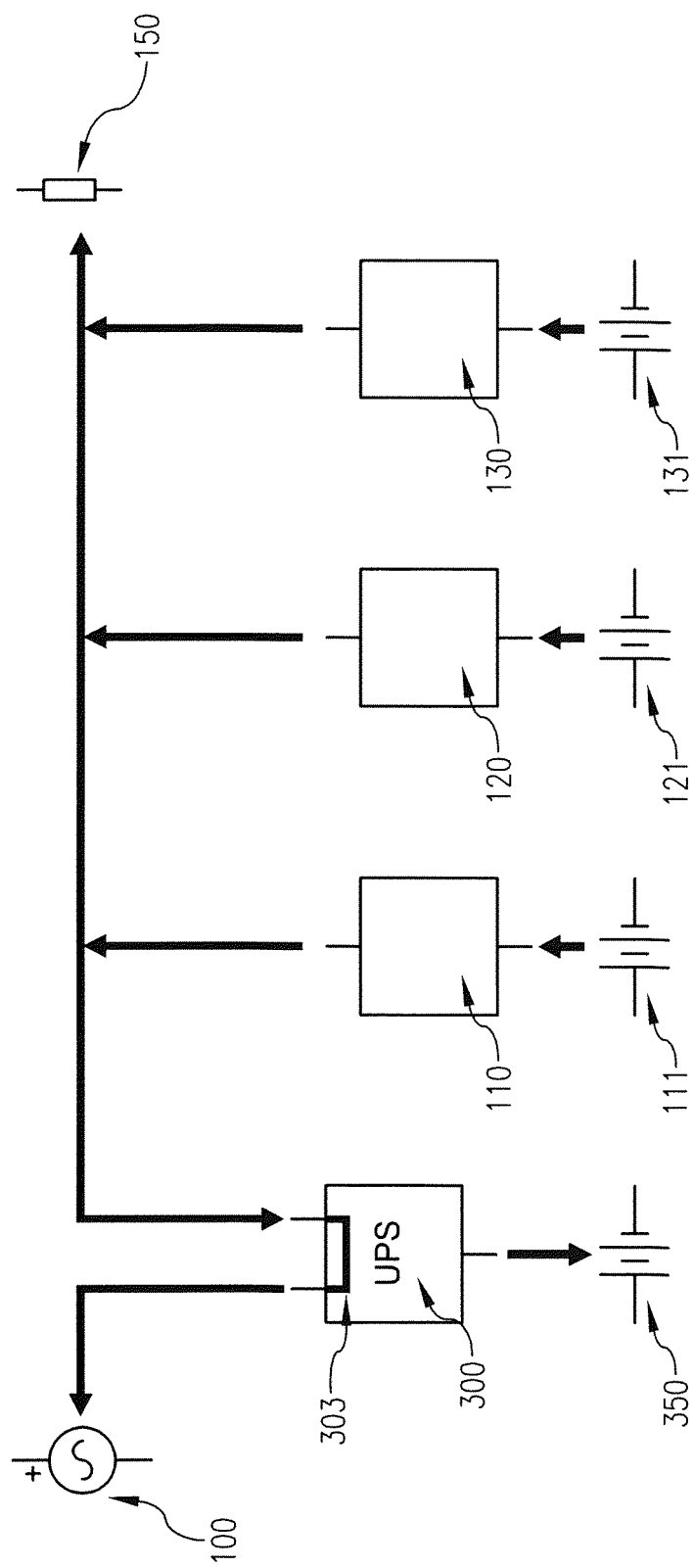
FIG. 5A is a diagram of the grid-tied photovoltaic system of FIG. 4 showing a flow of power when one or more current-source inverters are producing more power than is needed by a load.

FIGS. 5A-5H show various combinations of power flows (indicated by arrows) which are possible for the system of FIG. 4. Referring to FIG. 5A, in normal day-time operation when the micro-inverters 110,120,130 can produce appreciable power, the switch 303 is closed and the micro-inverters 110,120,130 produce more total power than is needed to supply the load 150. Net power is sourced to the utility grid 100, and the UPS 300 uses some of the excess power to charge the battery 350. The power converter 302 functions as a rectifier.

Figure 5B:
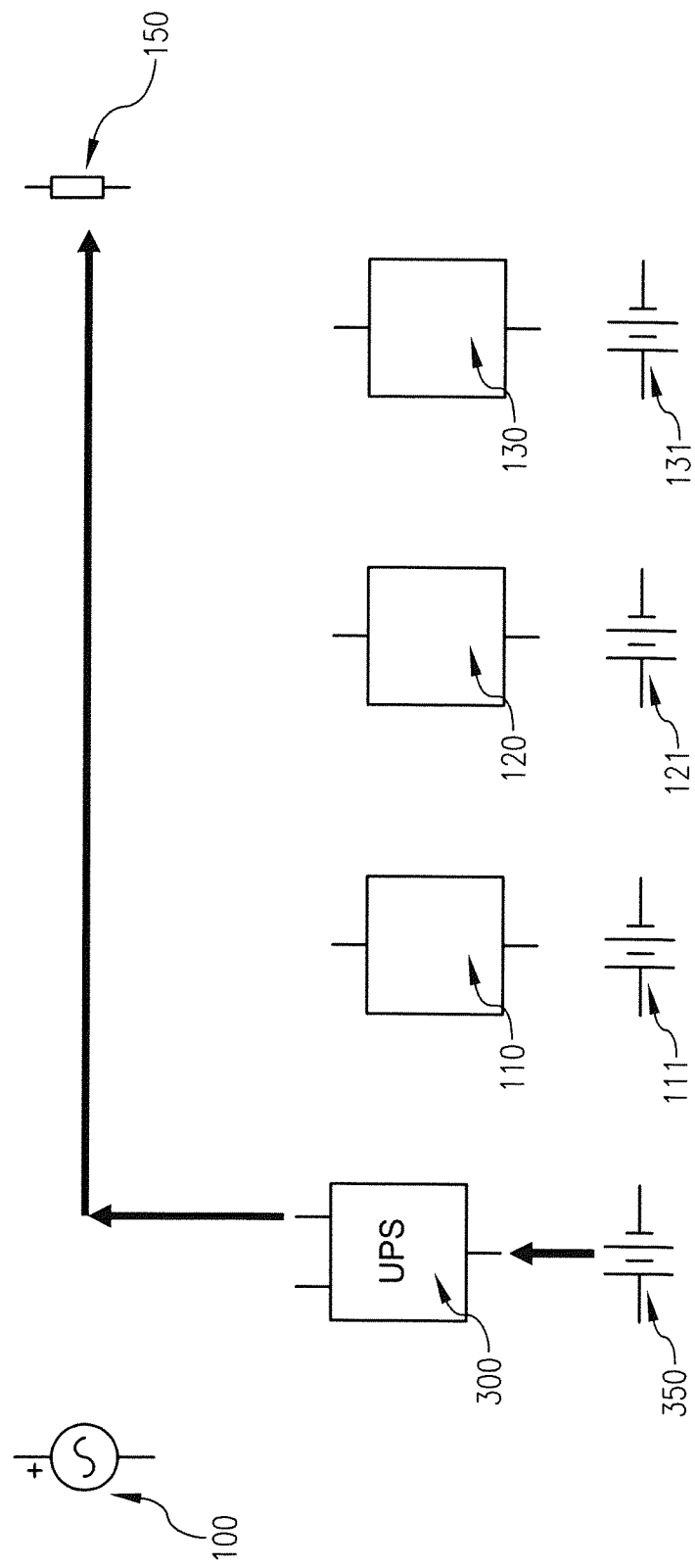
FIG. 5B is a diagram of the grid-tied photovoltaic system of FIG. 4 showing a flow of power when an electric utility grid is suffering an outage and an initial startup wait time is not complete.

Referring to FIG. 5B, immediately following a grid outage the switch 303 is open. The UPS 300 uses power from the battery 350 to provide AC voltage (but no appreciable power) to the micro-inverters 110,120,130 and to provide power to the load 150. The micro-inverters 110,120,130 are required to remain disconnected from the utility grid 100, typically for several minutes, following an outage, so this situation must remain in place until the micro-inverters 110,120,130 restart. The power converter 302 functions as a voltage source with constant frequency output.

Figure 5C:
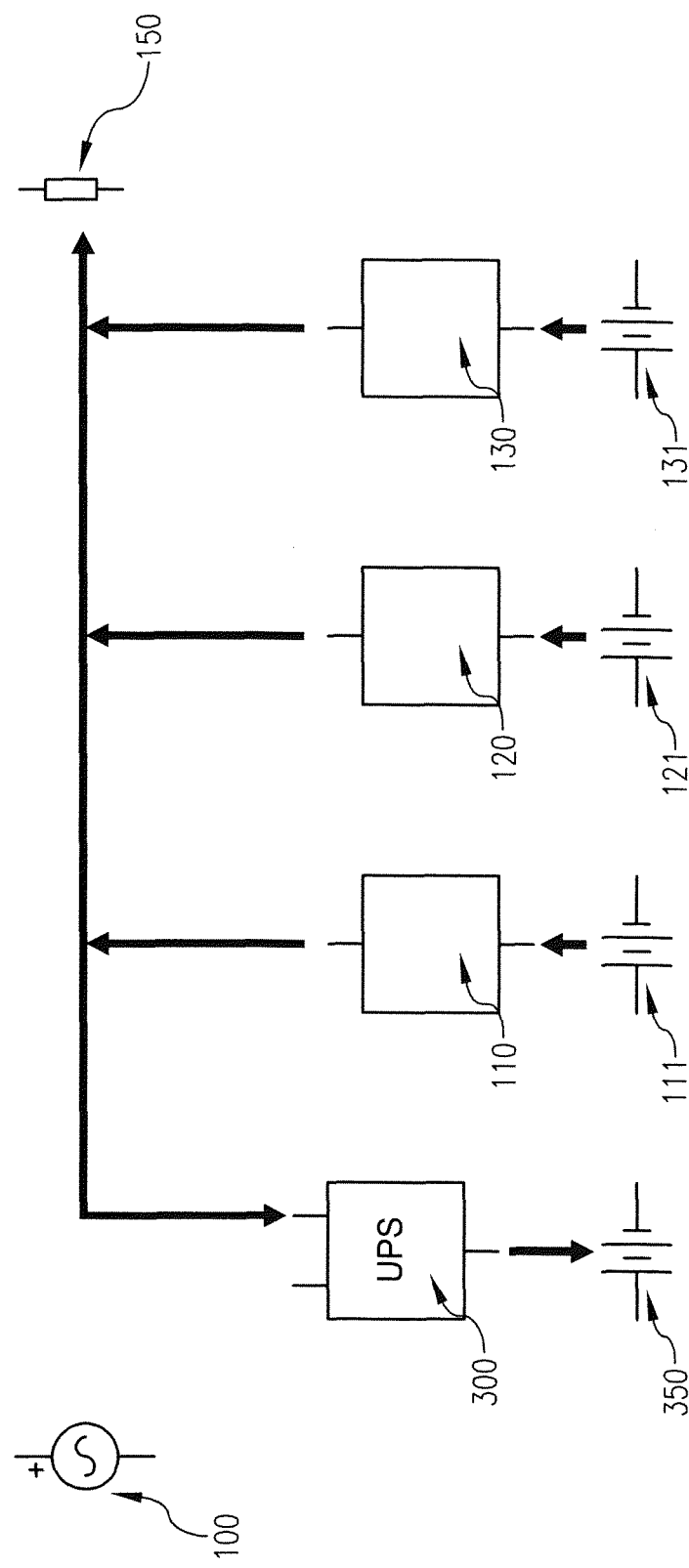
FIG. 5C is a diagram of the grid-tied photovoltaic system of FIG. 4 showing a flow of power when the electric utility grid is suffering an outage, the initial startup wait time is complete, and the current-source inverters are producing more power than is needed by the load.

Referring to FIG. 5C, during a grid outage and following the initial startup wait time of the micro-inverters 110,120,130, the switch 303 is open and the micro-inverters 110,120,130 provide more power than is needed to supply the load 150. Excess power is used to charge the battery 350. The power converter 302 functions as a voltage-source converter that is capable of absorbing power from its voltage terminals. When the battery 350 is fully charged, the power converter 302 may adjust the frequency of the voltage across the micro-inverters 110,120,130 to cause the power output of the micro-inverters 110,120,130 to be reduced.

Figure 5D:
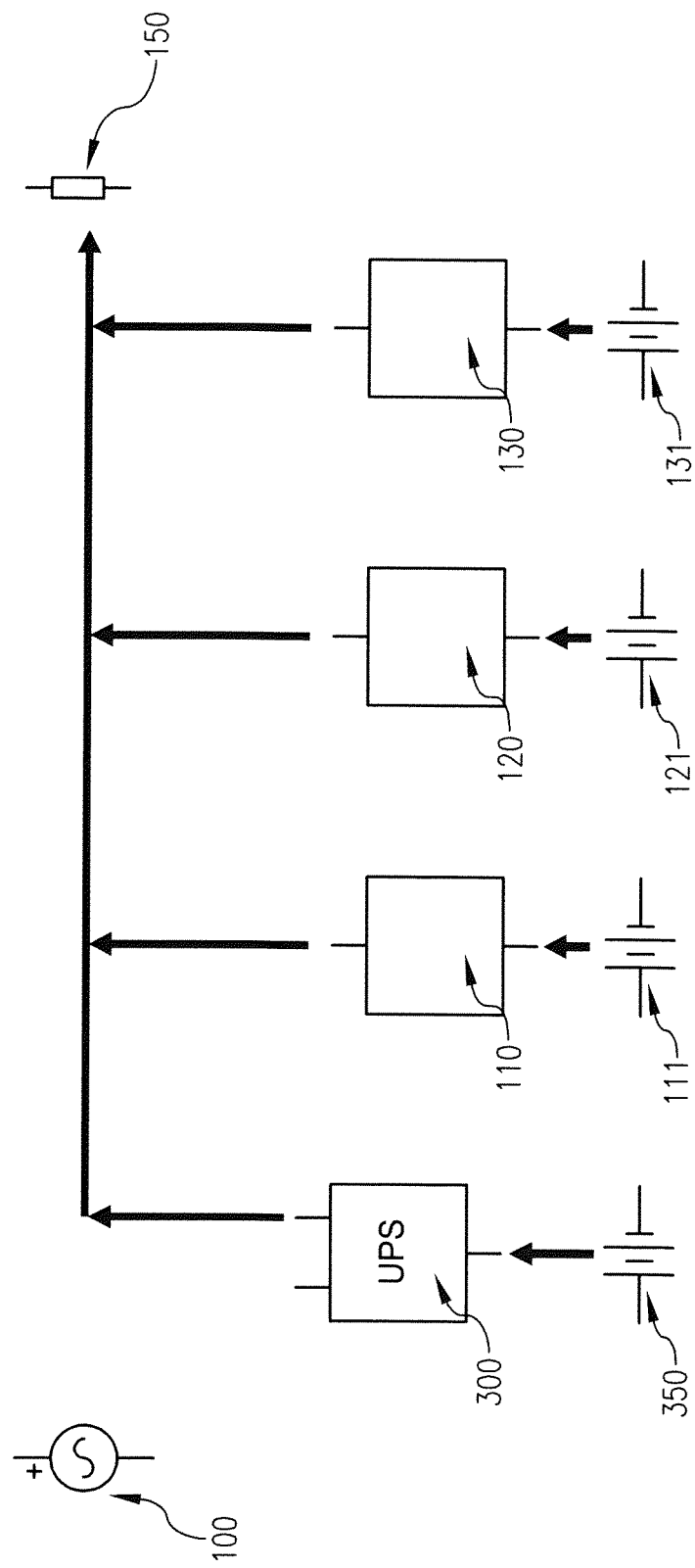
FIG. 5D is a diagram of the grid-tied photovoltaic system of FIG. 4 showing a flow of power when the electric utility grid is suffering an outage, the initial startup wait time is complete, and the current-source inverters are producing less power than is needed by the load.

Referring to FIG. 5D, during a grid outage and following the initial startup wait time of the micro-inverters 110,120,130, the switch 303 is open and the micro-inverters 110,120,130 provide less power than is needed to supply the load 150. Supplemental power is provided by the battery 350 to fulfill the power needs of the load 150. The power converter 302 functions as a voltage-source converter.

Figure 5E:
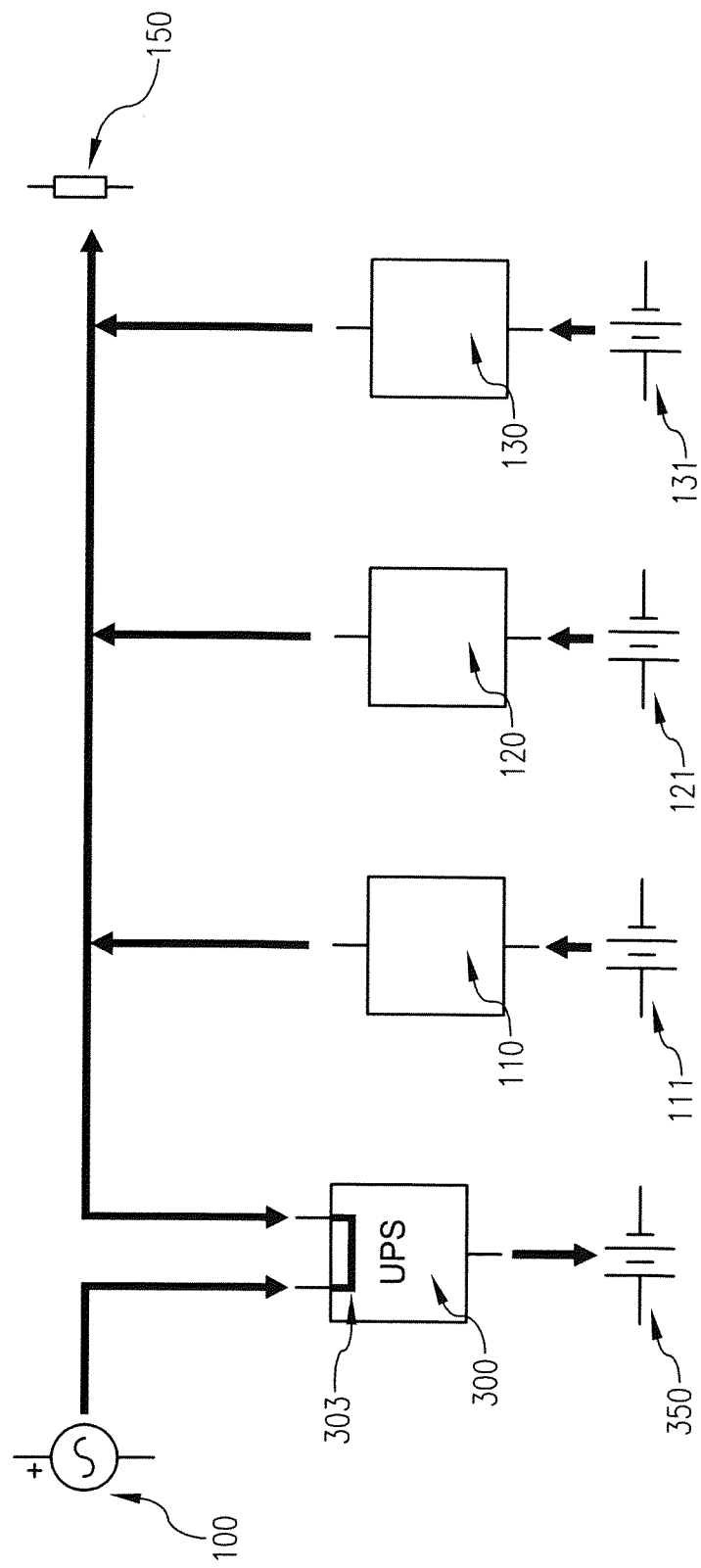
FIG. 5E is a diagram of the grid-tied photovoltaic system of FIG. 4 showing a flow of power when the current-source inverters are producing less power than is needed by the load.

Referring to FIG. 5E, during normal operation when the micro-inverter power is lower than required by the load 150, the switch 303 is closed and the utility grid 100 charges the battery 350. The power converter 302 functions as a rectifier.

Figure 5F:
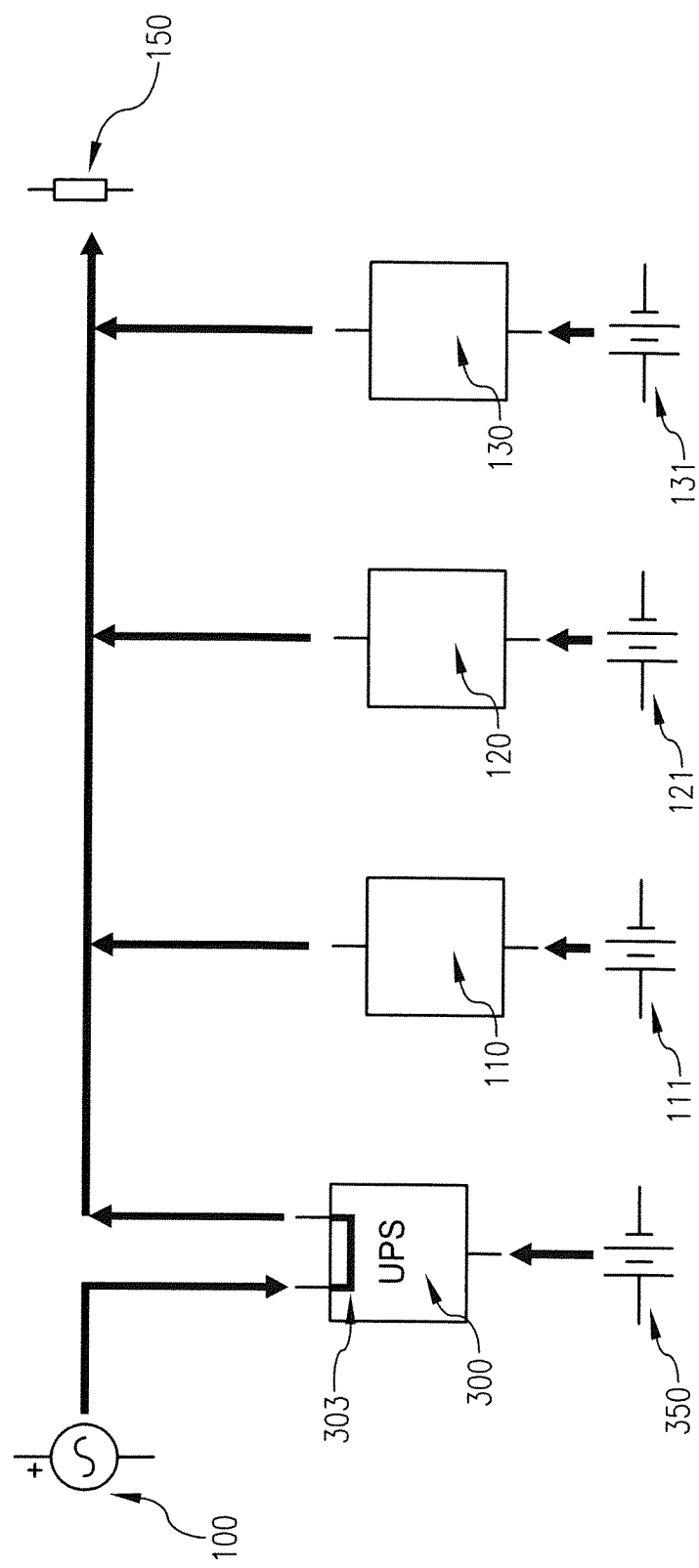
FIG. 5F is a diagram of the grid-tied photovoltaic system of FIG. 4 showing a flow of power when the current-source inverters are producing less power than is needed by the load, and the additional power that would otherwise be drawn from the electric utility grid would exceed an allowable peak load.

Referring to FIG. 5F during normal operation when the micro-inverter power is lower than required by the load 150, and the power that would typically be drawn from the grid 100 would exceed the allowable peak load, the battery 350 provides sufficient to power to keep the grid power below the allowable peak load power. The power converter 302 functions as a current-source inverter.

Figure 5G:
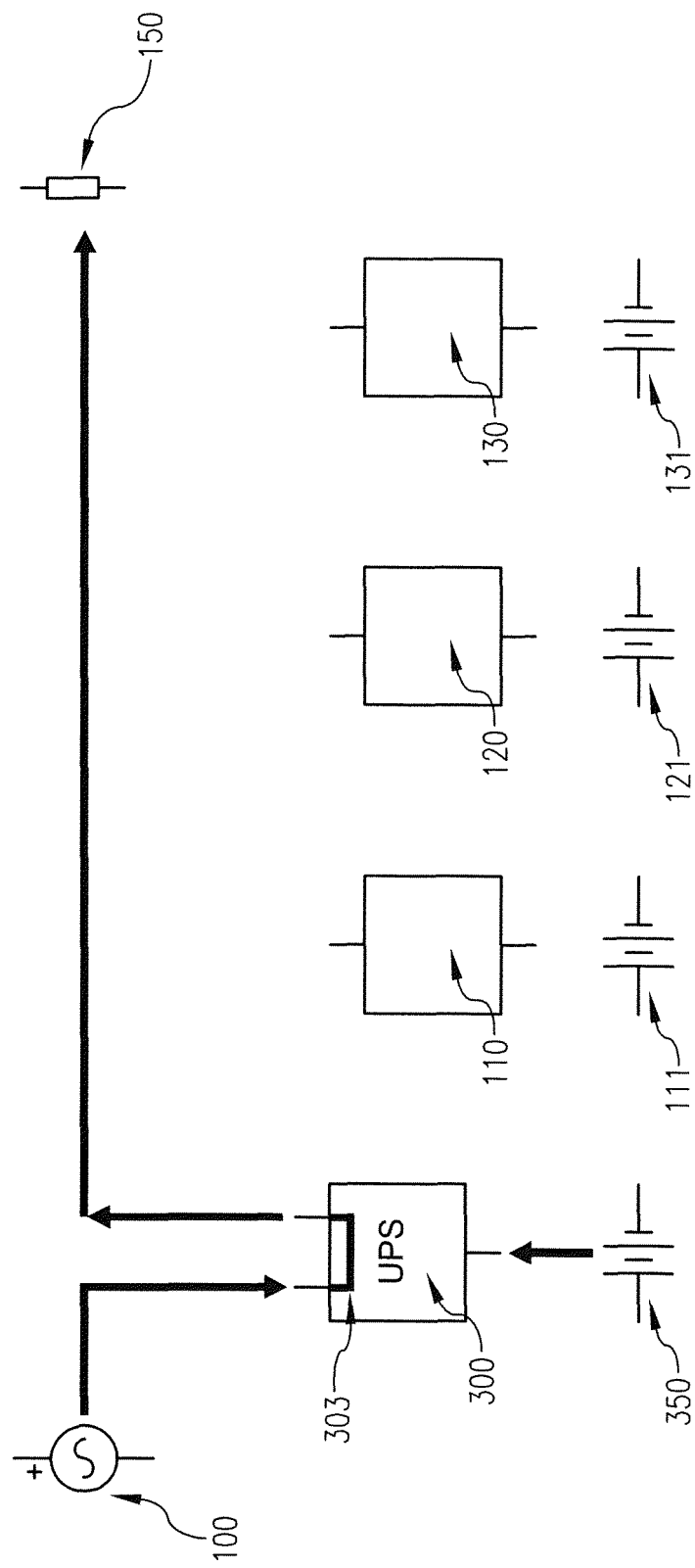
FIG. 5G is a diagram of the grid-tied photovoltaic system of FIG. 4 showing a flow of power when it is night and the current-source inverters are off.

Referring to FIG. 5G, during darkness, the switch 303 is closed, the micro-inverters 110,120,130 are off, and the grid 100 provides power to the load 150 and power to charge the battery 350. The power converter 302 functions as a rectifier.

Figure 6:
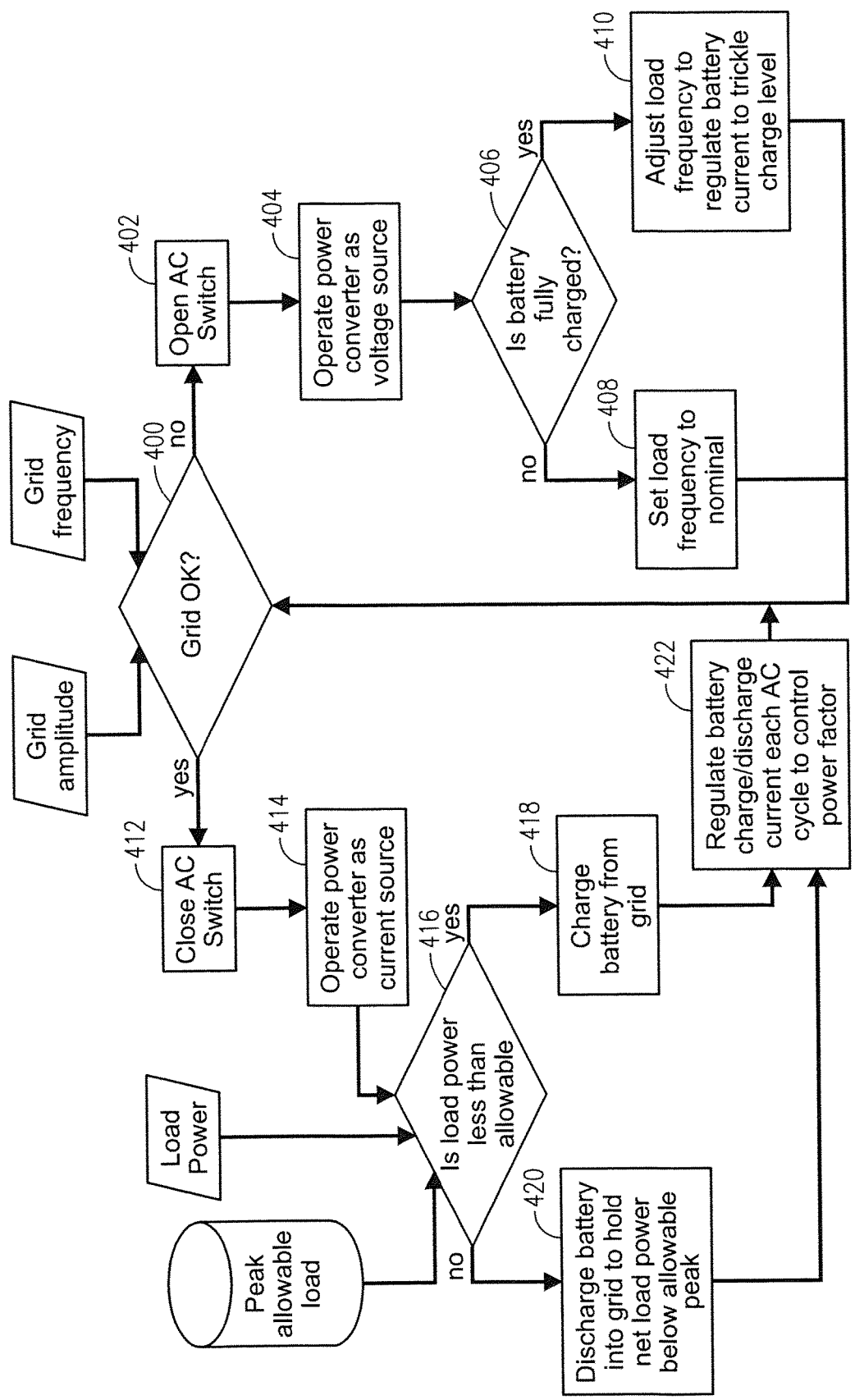
FIG. 6 is a flowchart of steps performed by the UPS of FIG. 3.

Referring to FIG. 6, a control flow algorithm for the controller 301 of FIG. 3 is shown. The controller 301 monitors the voltage on the AC port 305 to determine the grid amplitude and frequency, as shown in step 400. If the grid amplitude or frequency is outside of allowable limits, then "Grid OK?"="no". In this case, the controller 301 opens the AC switch 303 to disconnect the grid 100 from the load 150 and from the micro-inverters 110,120,130, as shown in step 402. The controller 301 then causes the power converter 302 to function as a voltage-source converter, as shown in step 404. The controller 301 checks the charge state of the battery 350 by monitoring the current and voltage on the DC port 306, as shown in step 406. If the battery 350 is charging, the controller 301 sets the frequency on the load port 304 to the nominal frequency, thus allowing maximum power flow from the micro-inverters 110,120,130, as shown in step 408. If the battery 350 is fully charged, the controller 301 adjusts the frequency on the load port 304 to cause the micro-inverters 110,120,130 to reduce their power output until the battery 350 on the DC port 306 is being trickle-charged, as shown in step 410. Note that it is also possible for the controller 301 to utilize more complex battery charging algorithms such as are known in the industry through control of the load port frequency.

If the grid amplitude and frequency remain inside of allowable limits, then "Grid OK?"="yes". In this case, the controller 301 closes the AC switch 303, as shown in step 412, and causes the power converter 302 to function as a current-source inverter, as shown in step 414. To determine the direction of power flow relative to the battery 350, the controller 301 compares the net power being consumed on the load port 304 (which is a combination of power consumed by the load 150 and power produced by the micro-inverters 110,120,130) with the allowable peak load power, as shown in step 416. As a current-source inverter, the power converter 302 can either take current from the grid 100 on the AC port 305 to charge the battery 350, as shown in step 418, or it can source current into the grid 100 by taking power from the battery 350, as shown in step 420.

The allowable peak load power could be a fixed number programmed into the controller 301 or it can be a load curve as a function of time-of-day if the controller 301 includes a real-time clock. Furthermore, the allowable peak load power can be made to vary by season, month, or day-of-the-week if the controller 301 includes a calendar. It is also possible for the value of the allowable peak load power to be varied dynamically through a communication link between the controller 301 and the electric utility.

The controller 301 then conditions the power either produced or absorbed by the power converter 302 in such a way as to regulate the power factor of the current flowing into or out of the grid 100, as shown in step 422. The power factor can be conditioned to compensate for a distortion current in the load 150 by regulating the current into or out of the load port 304. Furthermore, the power factor can be conditioned to produce displacement current in the grid 100 according to either preset commands or commands received through an external communication port.

The present invention provides advantages over the prior art, including a grid-tie function, a backup power function, a voltage-frequency relay function, a power factor control function, and a load-leveling function.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An uninterruptible power supply comprising:
 a bi-directional converter configured to operate as an alternating current voltage source;
 a direct current power port configured to be coupled to a battery;
 a first alternating current power port coupled to the bi-directional converter and configured to be coupled to a current-source inverter, wherein the current-source inverter is configured to adjust an output power as a function of a frequency of the alternating current voltage source; and
 a controller configured to regulate a power flow of the current-source inverter by adjusting a frequency of the alternating current voltage source.

2. The uninterruptible power supply as set forth in claim 1, in which the controller is configured to regulate the power flow of the current-source inverter to maintain the battery at a predetermined ideal charging state.

3. The uninterruptible power supply as set forth in claim 1, further including a second alternating current power port configured to be coupled to an alternating current grid.

4. The uninterruptible power supply as set forth in claim 1, in which the bi-directional converter is also configured as an active rectifier.

5. The uninterruptible power supply as set forth in claim 4, in which the bi-directional converter is also configured as an alternating current source.

6. The uninterruptible power supply as set forth in claim 5, in which the first alternating current power port is also configured to be coupled to a load.

7. The uninterruptible power supply as set forth in claim 6, in which the current-source inverter is configured to disconnect from the alternating current voltage source for a predetermined outage period when the alternating current voltage source frequency goes outside of a predetermined frequency limit, and in which the controller is configured to control the bi-directional power converter to source power to the load during the predetermined outage period.

8. The uninterruptible power supply as set forth in claim 6, in which the controller includes a predetermined power level set-point, and in which the controller is configured to source power from the battery to the alternating current grid when the power sourced from the alternating current grid exceeds the predetermined power level set-point.

9. The uninterruptible power supply as set forth in claim 8, in which the controller includes a non-volatile memory element configured to store the predetermined power level set-point.

10. The uninterruptible power supply as set forth in claim 8, in which the controller includes a real-time clock, and in which the predetermined power level set-point varies as a function of the time of day as determined by the real-time clock.

11. The uninterruptible power supply as set forth in claim 8, in which the controller further includes a calendar function, and in which the predetermined power level set-point varies as a function of the day as determined by the calendar function.

12. The uninterruptible power supply as set forth in claim 8, in which the controller is provided with a communication element, and the communication element is configured to receive a real-time update of the power level set-point.

13. The uninterruptible power supply as set forth in claim 7, in which the controller is configured to disconnect the current-source inverter from the alternating current grid when a voltage or frequency of the alternating current grid goes outside of a predetermined limit.

14. The uninterruptible power supply as set forth in claim 6, in which the controller is configured to regulate a power flow of the current-source inverter so as to cancel a distortion current produced by the load.

15. The uninterruptible power supply as set forth in claim 1, in which the controller is configured to regulate a power flow of the current-source inverter to produce an alternating current that is displaced from the grid voltage.

16. The uninterruptible power supply as set forth in claim 15, in which an amount of displacement of the alternating current is determined by a preset limit.

17. The uninterruptible power supply as set forth in claim 15, in which the amount of displacement of the alternating current is controlled through external communication with the controller.

18. An uninterruptible power supply comprising:
 a bi-directional converter configured to operate as an alternating current voltage source and as an alternating current source;
 a direct current power port configured to be coupled to a battery;

a first alternating current power port coupled to the bi-directional converter and configured to be coupled to a current-source inverter and to a load, wherein the current-source inverter is configured to adjust an output power as a function of a frequency of the alternating current voltage source, and wherein the current-source inverter is configured to disconnect from the alternating current voltage source for a predetermined outage period when the alternating current voltage source frequency goes outside of a predetermined frequency limit, and in which the controller is configured to control the bi-directional power converter to source power to the load during the predetermined outage period; and a controller configured to—
  regulate a power flow of the current-source inverter by adjusting a frequency of the alternating current voltage source, and
  regulate the power flow of the current-source inverter to maintain the battery at a predetermined ideal charging state.

19. The uninterruptible power supply as set forth in claim 18, further including a second alternating current power port configured to be coupled to an alternating current grid, and in which the controller is further configured to—
  source power from the battery to the alternating current grid when the power sourced from the alternating current grid exceeds a predetermined power level set-point; and
  disconnect the current-source inverter from the alternating current grid when a voltage or frequency of the alternating current grid goes outside of a predetermined limit.

20. An uninterruptible power supply for managing power flow in a grid-tied photovoltaic system, the uninterruptible power supply comprising:

a bi-directional converter configured to operate as an alternating current voltage source and as an alternating current source;

a direct current power port configured to be coupled to a battery;

a first alternating current power port coupled to the bi-directional converter and configured to be coupled to a current-source inverter and to a house load, wherein the current-source inverter is configured to adjust an output power as a function of a frequency of the alternating current voltage source, and wherein the current-source inverter is configured to disconnect from the alternating current voltage source for a predetermined outage period when the alternating current voltage source frequency goes outside of a predetermined frequency limit, and in which the controller is configured to control the bi-directional power converter to source power to the house load during the predetermined outage period;

a second alternating current power port configured to be coupled to an alternating current utility grid; and a controller configured to—
  regulate a power flow of the current-source inverter by adjusting a frequency of the alternating current voltage source, and
  regulate the power flow of the current-source inverter to maintain the battery at a predetermined ideal charging state,
  source power from the battery to the alternating current utility grid when the power sourced from the alternating current utility grid exceeds a predetermined power level set-point, and
  disconnect the current-source inverter from the alternating current utility grid when a voltage or frequency of the alternating current utility grid goes outside of a predetermined limit.

\* \* \* \* \*